US012007106B2

(12) United States Patent
Lee

(10) Patent No.: US 12,007,106 B2

(45) Date of Patent: Jun. 11, 2024

(54) FLEXIBLE WIRE SUPPORT STRUCTURE AND LAMP CONDUCTOR-CABLE USING SAME

(71) Applicant: Chuan-Yang Lee, Xinpu Township (TW)

(72) Inventor: Chuan-Yang Lee, Xinpu Township (TW)

( * ) Notice: Subject to any disclaimer, the term of this patent is extended or adjusted under 35 U.S.C. 154(b) by 89 days.

(21) Appl. No.: 17/844,068

(22) Filed: Jun. 20, 2022

(65) Prior Publication Data

US 2023/0408077 A1 Dec. 21, 2023

(51) Int. Cl.
*F21V 23/06* (2006.01)
*H01B 7/00* (2006.01)
*H01B 7/04* (2006.01)

(52) U.S. Cl.
CPC ........... *F21V 23/06* (2013.01); *H01B 7/0045* (2013.01); *H01B 7/04* (2013.01)

(58) Field of Classification Search
CPC ....... H01B 7/1895; F21S 4/10; B60R 16/0207
See application file for complete search history.

(56) References Cited

U.S. PATENT DOCUMENTS 4,409,431 A * 10/1983 Neuroth ............... H01B 7/0869 174/109
6,142,646 A * 11/2000 Liu ...................... H01R 33/965 439/619
7,153,019 B2 * 12/2006 Kuo .......................... F21S 4/10 439/619
7,999,184 B2 * 8/2011 Wiebelhaus ........... H01B 11/06 174/113 C
10,950,369 B1 * 3/2021 Farkas ............... H01B 11/1834
2004/0012961 A1 * 1/2004 Wong .................. F21V 19/0005 362/249.01
2004/0012963 A1 * 1/2004 Fan Wong ............ F21V 31/005 362/267
2015/0338036 A1 * 11/2015 Han ...................... F21V 23/002 362/249.08
2021/0167587 A1 * 6/2021 Komori .................... H02G 3/04

* cited by examiner

*Primary Examiner* — Paresh Paghadal
(74) *Attorney, Agent, or Firm* — Leong C. Lei

(57) ABSTRACT

Disclosed are a flexible wire support structure and a lamp conductor-cable using the same, which is formed of a first flexible wire and a second flexible wire that are arranged adjacent to and in juxtaposition with each other. An enclosure binding layer encloses an outside of the first and second flexible wires. At least one supporting body is arranged between the adjacent first and second flexible wires. The supporting body has two surfaces that are respectively formed with a first receiving groove and a second receiving groove extending along an axis line of the first and second flexible wires. The first and second receiving grooves receive the adjacent first and second flexible wires to dispose therein so as to have the supporting body filled between the adjacent first and second flexible wires, to realize supporting and constraining of the adjacent flexible wires.

6 Claims, 8 Drawing Sheets

(B-B)

FLEXIBLE WIRE SUPPORT STRUCTURE AND LAMP CONDUCTOR-CABLE USING SAME

TECHNICAL FIELD OF THE INVENTION

The present invention relates generally to a technique for shaping and supporting of flexible wires that are arranged adjacent to and in juxtaposition with each other, and more particularly to a flexible wire support structure and a lamp conductor-cable using the same, which helps shape and constrain adjacent flexible wires that are arranged in juxtaposition with each other and prevents the adjacent wires from entangling during enclosing so as to realize smoothness and completeness of an enclosure surface and also to prevent invasion of moisture and dust to thereby improve operation safety.

DESCRIPTION OF THE PRIOR ART

Flexible wires that are arranged adjacent to and in juxtaposition with each other, such as positive and negative wires of Christmas lights arranged in a stringed form) may cause trouble in management and organization of a certain length thereof, due to the flexibility thereof. An example is provided in FIGS. 1 and 2 as a Christmas light, which is for arrangement in a stringed form, comprising a soft base (10) that is formed with an insertion guide hole (11) into which a light-emitting element (30) having a corresponding insertion pin (31) is selectively inserted. The soft base (10) is connected to a conductor cable (20) for supply of electricity. The conductor cable (20) is generally formed of a first electrical wire (21) (which is also referred to as a first flexible wire) and a second electrical wire (22) (which is also referred to as a second flexible wire) that are arranged in juxtaposition with or side by side with each other and are respectively connected to positive and negative terminals of a power supply source. To avoid influence of use resulting from splitting and separation of the first and second electrical wires (21, 22) of the conductor cable (20), it is common that an enclosure binding layer (25) made of a heat-shrinkage film tube is provided to enclose, and thus loop around, an outside of the first and second electrical wires (21, 22) for clustering, to prevent the first and second electrical wires (21, 22) of the conductor cable (20) from splitting.

However, as shown in FIG. 3, the first and second electrical wires (21, 22) of the conductor cable (20) are not properly constrained and supported. The first and second electrical wires (21, 22) may easily have a portion (A) thereof twisted and entangled. Further, as shown in FIGS. 4 and 5, when a heat-shrinking film that makes the enclosure binding layer (25) is heated and thus shrunk to enclose and thus loop around and cluster together the first and second electrical wires (21, 22), a portion (B) of the enclosure binding layer (25) corresponding to a space between the first and second electrical wires (21, 22) may get recessed, making the conductor cable (20) not effectively enclosed in a closely fitting manner and thus affecting the appearance aesthetics thereof. Further, the enclosure binding layer (25) only surrounds the outer circumference of the first and second electrical wires (21, 22), and moisture or dust may get invading from a space between the first and second electrical wires (21, 22) at an end of the conductor cable (20). This would cause a direct influence on the operation safety. Thus, there is a need to further improve a known flexible wire arrangement, such as the conductor cable (20), and this is also an object that the present invention is made for investigating for.

In view of the above drawbacks and needs, the present invention aims to provide a flexible wire support structure and a lamp conductor-cable using the same for overcoming the problems and inconveniences of the prior art in respect of closely fitting enclosure and leaking protection.

SUMMARY OF THE INVENTION

Thus, the primary objective of the present invention is to provide a flexible wire support structure and a lamp conductor-cable using same, which enhance an effect of supporting and constraining for flexible wires, so as to prevent twisting and entangling of the flexible wires and also to make them enclosed in a flat, smooth, and closely fitting manner to thereby improve appearance aesthetics.

Further, another objective of the present invention is to provide a flexible wire support structure and a lamp conductor-cable using same, which realize an effect of sealing an end thereof so as to prevent invasion of moisture and dust through penetrating a space existing therein thereby improving overall safety and utilization.

For this, the present invention mainly adopts the following technical solution to realize the above purposes and effectiveness, which comprises:

- a first electrical wire;
- a second electrical wire, which is adjacent to and arranged side by side with the first electrical wire on a light-emitting element, such that the first and second electrical wires supplies electricity to the light-emitting element;
- an enclosure binding layer, which encloses an outside of the first and second electrical wires for looping around and clustering together the first and second electrical wires;
- at least one supporting body, which is interposed between the first and second electrical wires, the supporting body having two surfaces that are respectively formed with a first receiving groove and a second receiving groove extending along an axis of the first and second electrical wires, wherein the first and second receiving grooves receive the adjacent first and second electrical wires to dispose therein respectively, so that the supporting body is filled between the first and second electrical wires.

Through implementation of the previously described technical solution, the present invention uses an arrangement that a supporting body is interposed between first and second electrical wires of a conductor cable to avoid invasion of moisture and dust and provide ends of the first and second electrical wires of the conductor cable with an effect of leaking protection so as not to result in influence on operation safety and also prevent twisting and entangling, and allowing the enclosure binding layer to be made in a close fitting and flat and smooth form to thereby effectively enhance utilization thereof and also to enhance overall operation safety for further improving additional values and economic value thereof.

Further, the present invention also adopts the following technical solutions, for further realizing the above-mentioned purposes and effectiveness, which comprise:

The enclosure binding layer comprises a heat-shrinkage film tube.

The supporting body has a height that is equal to a diameter of the first or second flexible wire.

The supporting body is formed with a sideway lip in each of two side edges of each of the first and second receiving grooves to project toward a circumference of the first or second flexible wire.

The sideway lips of the supporting body that are formed on the two side edges of each of the first and second receiving grooves are coincident with tangential lines at points of circumferences of the first and second flexible wires intersecting vertical radial lines.

The light-emitting element comprises an insertion pin, and the insertion pin of the light-emitting element is selectively insertable into a soft base that is formed with an insertion guide hole corresponding thereto, wherein the soft base is structured to have the first and second electrical wires arranged adjacent thereto each other for supplying electricity.

DETAILED DESCRIPTION OF THE PREFERRED EMBODIMENT

Figure 1:
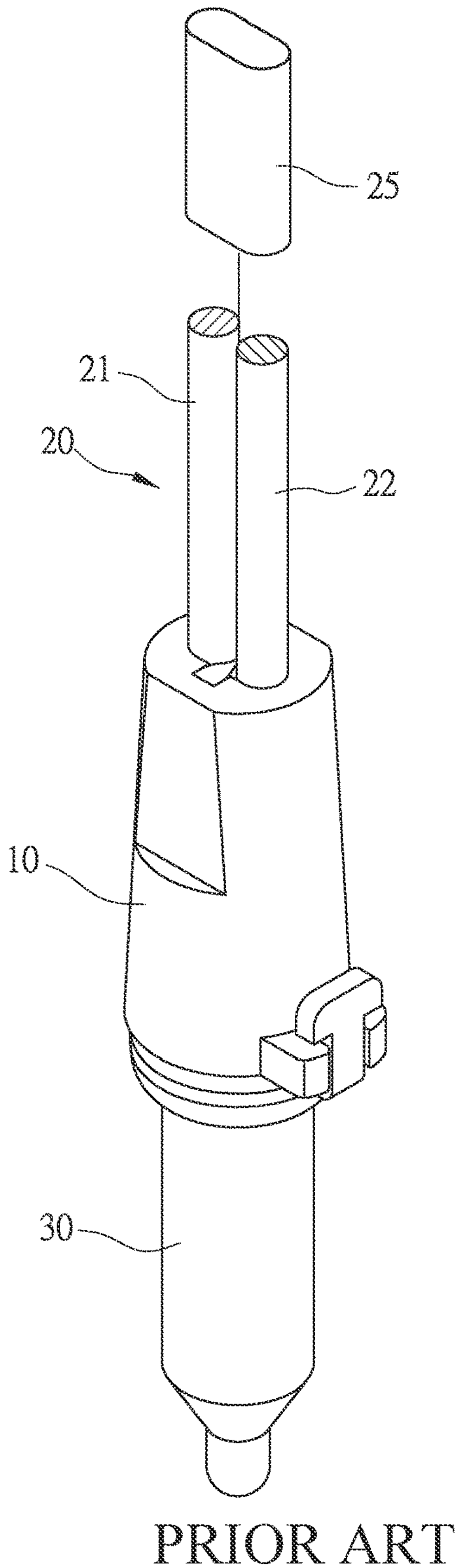
PRIOR ART FIG. 1
FIG. 1 is a perspective view of a known lamp conductor-cable.
Figure 2:
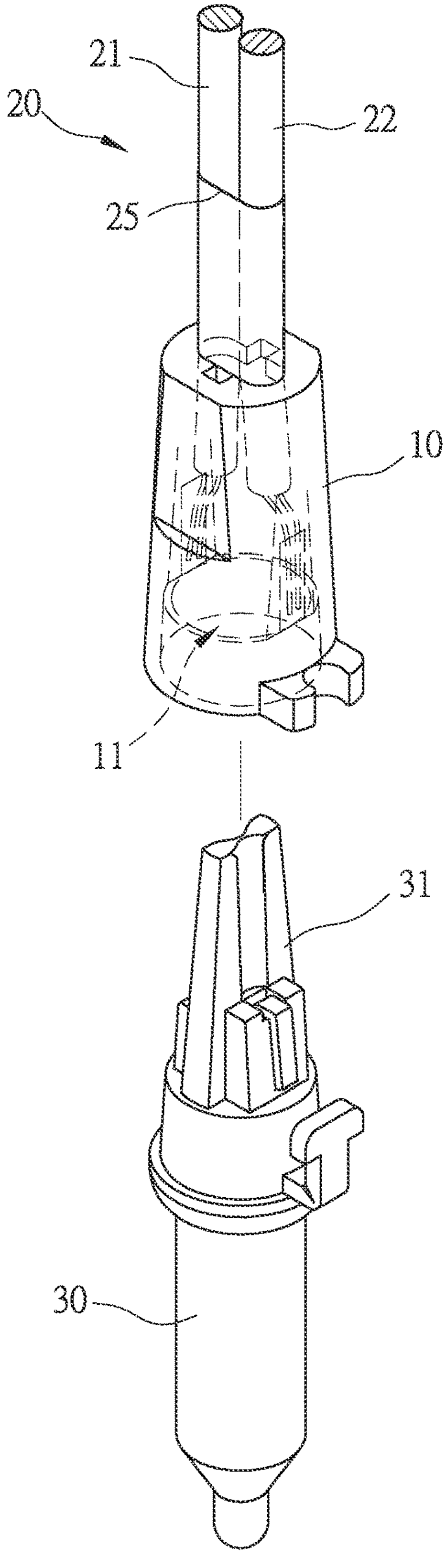
PRIOR ART FIG. 2
FIG. 2 is an exploded view illustrating an assembling arrangement and spatial relationship of the known lamp conductor-cable.
Figure 3:
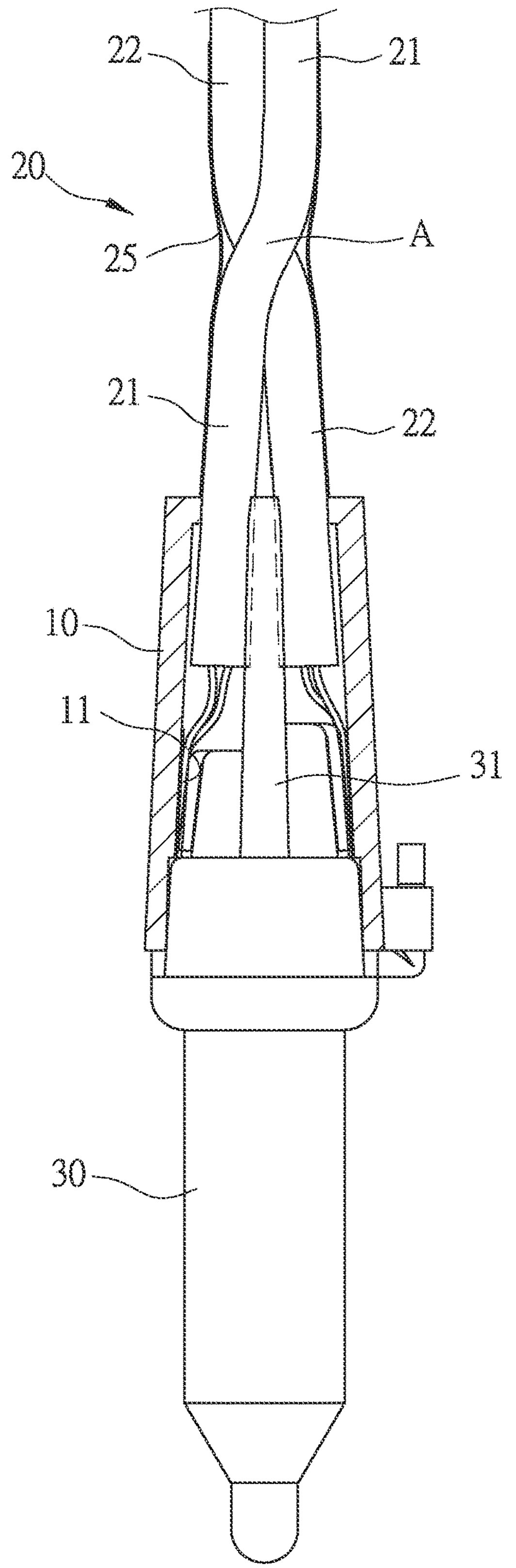
PRIOR ART FIG. 3
FIG. 3 is a side elevational view, partly sectioned, illustrating a condition of twisting and entangling of the known lamp conductor-cable.
Figure 4:
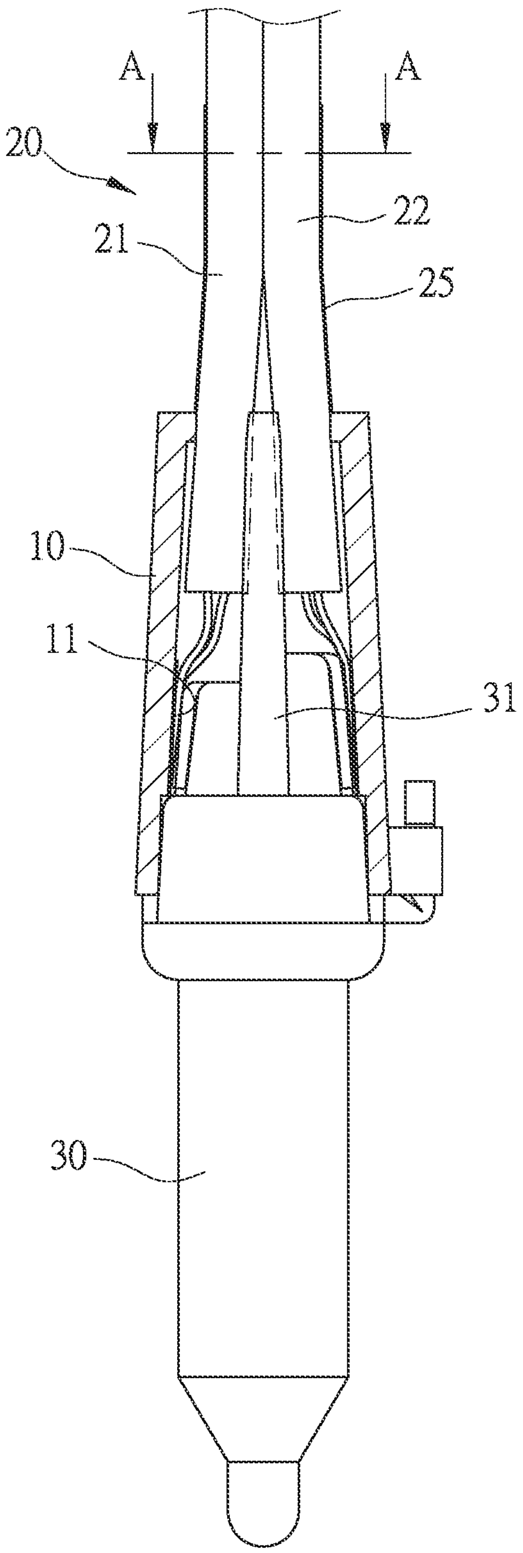
PRIOR ART FIG. 4
FIG. 4 is a side elevational view, partly sectioned, illustrating an assembled state of the known lamp conductor-cable.
Figure 5:
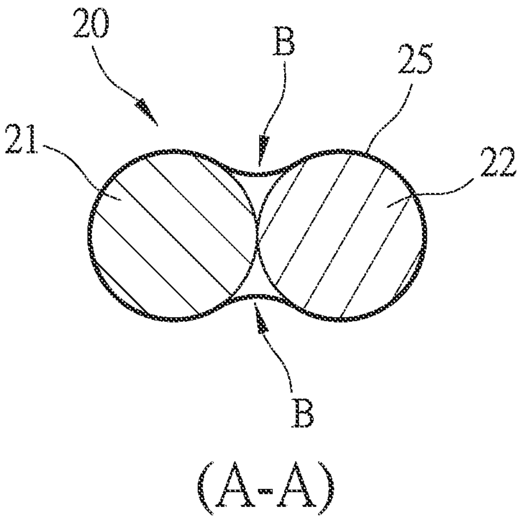
PRIOR ART FIG. 5
FIG. 5 is a cross-sectional view of the known lamp conductor-cable taken along line A-A of FIG. 4.

The present invention relates to a flexible wire support structure and a lamp conductor-cable using the structure. In an embodiment of the present invention and components thereof shown in the drawings, all recitations in relation to front and rear, left and right, top and bottom, upper and lower, and horizontal and vertical are made for easing the description, and not for limiting the present invention, and are not intended to limit the components in any specific location or space. Sizes and dimensions as set forth in the drawings and the disclosure can be varied according to the arrangement and requirement of the embodiment of the present invention, without departing from the scope of the present invention defined in the appended claims, and thus, the application is not subject to constraints from such a structural arrangement.

Figure 6:
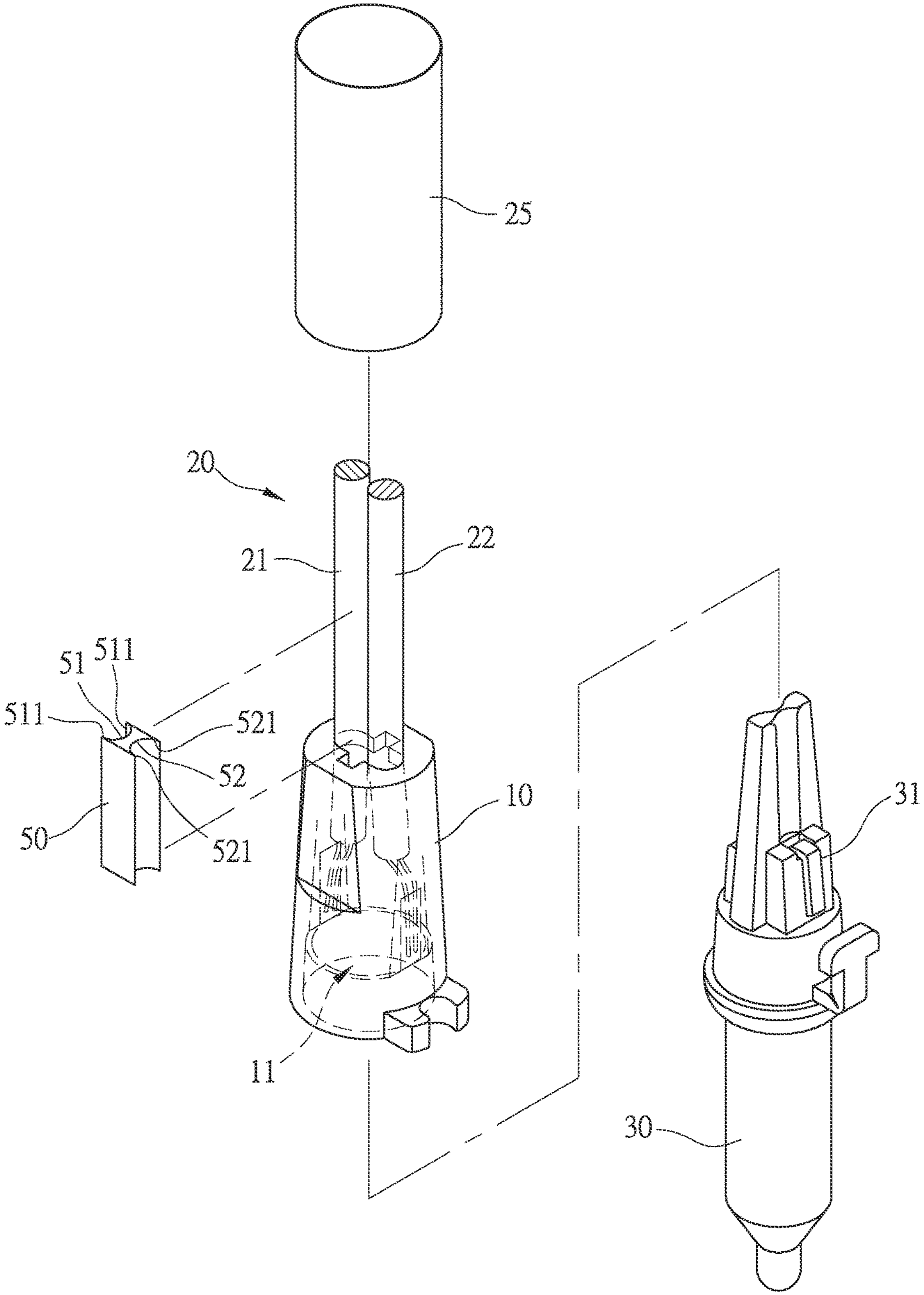
FIG. 6 is an exploded view showing a lamp conductor-cable according to the present invention to illustrate an assembling arrangement and spatial relationship thereof.
Figure 7:
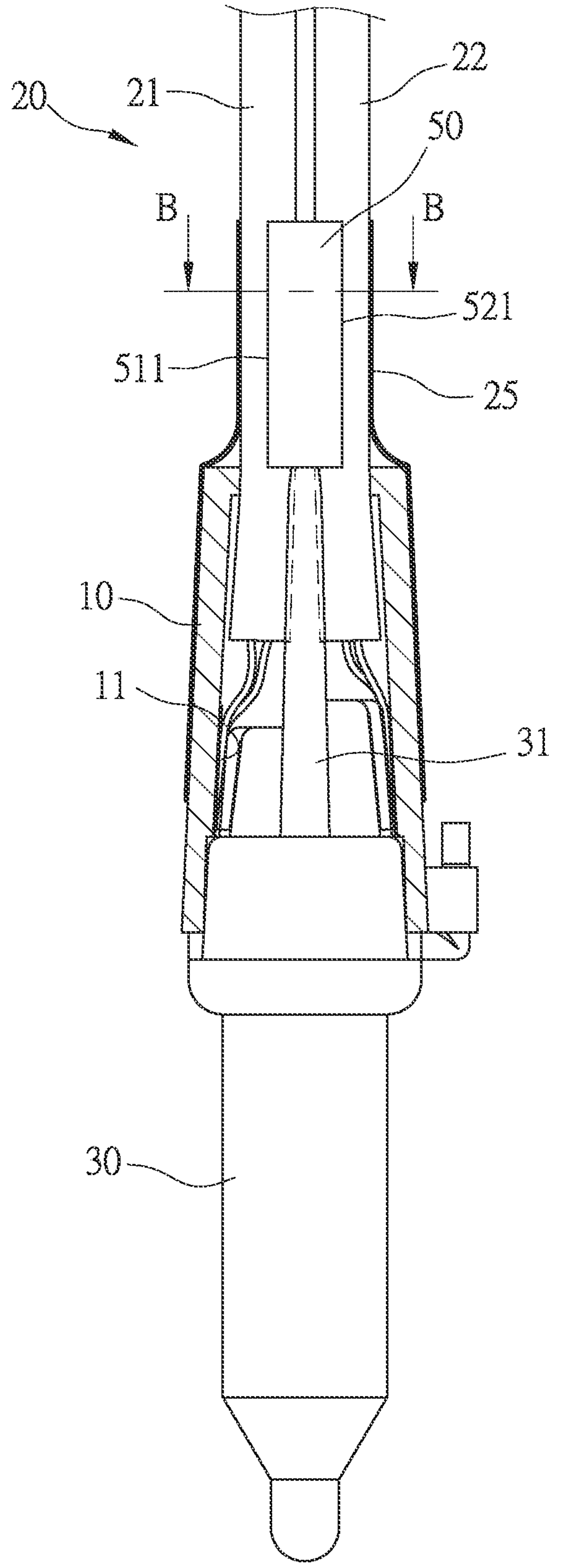
FIG. 7 is a side elevational view, partly sectioned, illustrating the lamp conductor-cable according to the present invention in an assembled state.
Figure 8:
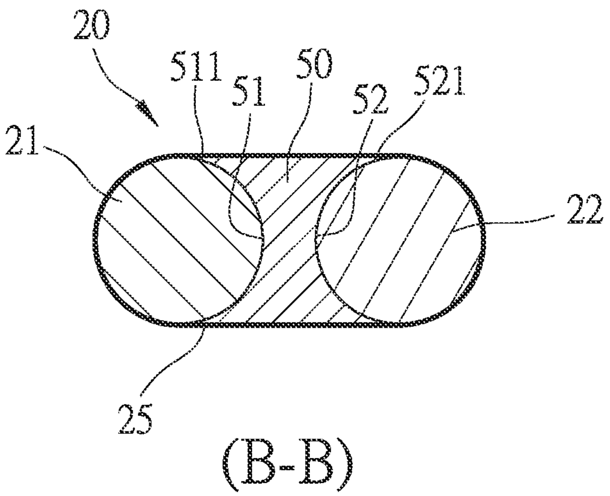
FIG. 8 is a cross-sectional view of the lamp conductor-cable according to the present invention taken along line A-A of FIG. 4.

The flexible wire support structure of the present invention is constructed as shown in FIGS. 6, 7, and 8, taking a lamp conductor-cable as an example, a conductor cable (20) is provided, at an end thereof, with a soft base (10), and the soft base (10) is formed, on an end thereof that is opposite to the conductor cable (20), with an insertion guide hole (11) for selective insertion of a light-emitting element (30) that comprises an insertion pin (31) corresponding thereto. The conductor cable (20) is generally formed of a first electrical wire (21) (which is also referred to as a first flexible wire) and a second electrical wire (22) (which is also referred to as a second flexible wire) that are arranged in juxtaposition with or side by side with each other and are respectively connected to positive and negative terminals of a power supply source. To avoid influence of use resulting from splitting and separation of the first and second electrical wires (21, 22) of the conductor cable (20), it is common that an enclosure binding layer (25) made of a heat-shrinkage film tube is provided to enclose, and thus loop around, an outside of the first and second electrical wires (21, 22) for clustering, to prevent the first and second electrical wires (21, 22) of the conductor cable (20) from splitting.

The feature of the present invention resides in that at least one supporting body (50) is arranged between the first and second electrical wires (21, 22) of the conductor cable (20), and the supporting body (50) has a height that is equal to or slightly smaller than or slightly larger than a diameter of the first or second electrical wire (21, 22). In a preferred embodiment of the present invention, the height of the supporting body (50) is equal to the diameter of the first or second electrical wire (21, 22) (as shown in FIG. 8), so that the supporting body (50) completely fills up a gap between the adjacent first and second electrical wires (21, 22). Further, the supporting body (50) has two opposite surfaces that are respectively formed with a first receiving groove (51) and a second receiving groove (52) respectively corresponding to the adjacent first and second electrical wires (21, 22). Further, the first and second receiving grooves (51, 52) are arranged to extend along an axis of the first and second electrical wires (21, 22), and the supporting body (50) is formed with a sideway lip (511, 521) in each of two side edges of each of the first and second receiving grooves (51, 52) projecting toward a circumference of the first and second electrical wires (21, 22). In the preferred embodiment of the present invention, the sideway lips (511, 521) are made coincident with and flush with tangential lines of circumferences of the first and second electrical wires (21, 22) at points of the circumferences intersecting vertical radial line (as shown in FIG. 8), so that the two surfaces of the supporting body (50) that are parallel to each other are respectively flush with the outer circumferences of the first and second electrical wires (21, 22) at two opposite sides thereof, and the enclosure binding layer (25), after being set for enclosure, can have a surface that is flat, smooth, and in close fitting (as shown in FIG. 8).

As such, a flexible wire support structure that realize closely fitting enclosure and gap filling and a lamp conductor-cable using it are provided. Based on the structural arrangement provided above, in a practical use of the present invention, as shown in FIG. 7, the first and second electrical wires (21, 22) of the conductor cable (20) are supported and constrained by the supporting body (50), so as to avoid twisting and entangling of the first and second electrical wires (21, 22). Further, as shown in FIG. 8, the heat-shrinking film that makes the enclosure binding layer (25) is shrunk, such as being subjected to heating, to enclose and thus loop around and cluster together the first and second electrical wires (21, 22), and due to the supporting body (50) being filled in the gap between the first and second electrical wires (21, 22), the enclosure binding layer (25) that encloses and loops around an outer circumference of the first and second electrical wires (21, 22) is kept in a closely fitting, flat, and smooth form, making the outside appearance good looking. Further, the supporting body (50) arranged between the first and second electrical wires (21, 22) of the conductor cable (20) achieves an effect of leaking protection between ends of the first and second electrical wires (21, 22), to help prevent invasion of moisture or dust, so as not to affect operation safety.

The description in respect of the structure and operation provided above provides that the present invention provides an arrangement in which the supporting body (50) is disposed and interposed between the first and second electrical wires (21, 22) of the conductor cable (20) to realize leaking protection between ends of the first and second electrical wires (21, 22) of the conductor cable (20) for preventing invasion of moisture and dust so as not to affect operation safety, and also to achieve erection supporting and constraining for the first and second electrical wires (21, 22) of the conductor cable (20) to eliminate twisting and entangling and to allow the enclosure binding layer (25) to be set in an enclosing arrangement that is effective in keeping a closely fitting and smooth and flat configuration thereof around an outer circumference the first and second electrical wires (21, 22) to thereby improve appearance aesthetics and utilization.

I claim:

1. A lamp conductor-cable, comprising:

a first electrical wire;

a second electrical wire, which is adjacent to and arranged side by side with the first electrical wire, wherein the first and second electrical wires each have a proximal end that is mounted to a soft base on which a light-emitting element is arranged to electrically connect with the proximal ends of the first and second electrical wires, and the first and second electrical wires supply electricity to the light-emitting element through the proximal ends;

an enclosure binding layer, which encloses an outside of the first and second electrical wires for looping around and clustering together the first and second electrical wires; and a supporting body, which is interposed between the first and second electrical wires, the supporting body having two surfaces that are respectively formed with a first receiving groove and a second receiving groove extending along an axis of the first and second electrical wires, wherein the first and second receiving grooves receive the adjacent first and second electrical wires to dispose therein respectively, so that the supporting body is filled between the first and second electrical wires, and wherein each of the first and second electrical wires has a distal end opposite to the proximal end, and each of the first and second electrical wire has a portion between the proximal end and the distal end and extending out of the soft base through an end face of the soft base, wherein the supporting body is arranged between the portions of the first and second electrical wires at a location outside of and adjacent to the end face of the soft base and the enclosing binding layer encloses the outside of the first and second electrical wires, the supporting body between the portions of the first and second electrical wires, and at least a portion of the soft base to which the proximal ends of the first and second electrical wires are mounted.

2. The lamp conductor-cable according to claim 1, wherein the enclosure binding layer comprises a heat-shrinkage film tube.

3. The lamp conductor-cable according to claim 1, wherein the supporting body has a height that is equal to a diameter of the first or second electrical wire.

4. The lamp conductor-cable according to claim 1, wherein the supporting body is formed with a sideway lip in each of two side edges of each of the first and second receiving grooves to project toward a circumference of the first or second electrical wire.

5. The lamp conductor-cable according to claim 4, wherein the sideway lips of the supporting body that are formed on the two side edges of each of the first and second receiving grooves are coincident with tangential lines at points of circumferences of the first and second electrical wires intersecting vertical radial lines.

6. The lamp conductor-cable according to claim 1, wherein the light-emitting element comprises an insertion pin, and the insertion pin of the light-emitting element is selectively insertable into the soft base that is formed with an insertion guide hole corresponding thereto to electrically connect with the proximal ends of the first and second electrical wires.

* * * * *